US008978769B2

(12) United States Patent
Moore

(10) Patent No.: US 8,978,769 B2
(45) Date of Patent: Mar. 17, 2015

(54) OFFSHORE HYDROCARBON COOLING SYSTEM

(76) Inventor: Richard John Moore, Duncraig Western Australia (AU)

( * ) Notice: Subject to any disclaimer, the term of this patent is extended or adjusted under 35 U.S.C. 154(b) by 668 days.

(21) Appl. No.: 13/196,766

(22) Filed: Aug. 2, 2011

(65) Prior Publication Data

US 2012/0285656 A1 Nov. 15, 2012

(30) Foreign Application Priority Data

May 12, 2011 (AU) ................................ 2011901794

(51) Int. Cl.

| E21B 7/12 | (2006.01) |
|---|---|
| F24J 3/08 | (2006.01) |
| F25J 1/00 | (2006.01) |
| F25J 1/02 | (2006.01) |
| F28D 15/00 | (2006.01) |
| F28D 1/02 | (2006.01) |
| E02B 17/00 | (2006.01) |
| E21B 36/00 | (2006.01) |
| E21B 41/00 | (2006.01) |
| C10L 3/10 | (2006.01) |
| F28D 15/02 | (2006.01) |

(52) U.S. Cl.
CPC F24J 3/08 (2013.01); F25J 1/0022 (2013.01); F25J 1/0278 (2013.01); F25J 1/0296 (2013.01); F28D 15/00 (2013.01); F28D 1/022 (2013.01); E02B 17/00 (2013.01); E21B 36/001 (2013.01); E21B 41/0007 (2013.01); C10L 3/10 (2013.01); F28D 15/0266 (2013.01); Y02E 10/10 (2013.01)
USPC ......... 166/344; 166/352; 166/302; 166/75.12

(58) Field of Classification Search
CPC ............................... E21B 36/00; E21B 36/005
USPC ............................... 166/344, 352, 302, 75.12
See application file for complete search history.

(56) References Cited

U.S. PATENT DOCUMENTS

| 2,938,359 | A | * | 5/1960 | Cobb, Jr. et al. ................... 62/7 |
|---|---|---|---|---|
| 3,475,280 | A | * | 10/1969 | Oding ............................ 202/233 |
| 3,755,142 | A | * | 8/1973 | Whipple, Jr. .................... 210/758 |
| 3,949,693 | A | * | 4/1976 | Bauer et al. ..................... 114/265 |

(Continued)

FOREIGN PATENT DOCUMENTS

| JP | 10020081 | 1/1998 |
|---|---|---|
| WO | WO 02/101277 A3 | 12/2002 |
| WO | WO 2010/110674 A3 | 9/2010 |

*Primary Examiner* — Matthew Buck
*Assistant Examiner* — Aaron Lembo
(74) *Attorney, Agent, or Firm* — Klarquist Sparkman, LLP

(57) ABSTRACT

An offshore hydrocarbon cooling system is provided. The system includes one or more hydrocarbon process fluid heat exchangers arranged in heat exchange communication between a hydrocarbon process fluid and a cooling medium fluid, a cooling medium fluid distribution pipe system connected to the hydrocarbon process fluid heat exchangers, and a subsea cooling unit for cooling the cooling medium fluid. The subsea cooling unit includes an inlet and an outlet arranged in fluid communication with the cooling medium fluid distribution pipe system, one or more subsea cooling modules, a first conduit arranged to provide fluid communication between the inlet and the subsea cooling module(s) and a second conduit arranged to provide fluid communication between the subsea cooling module(s) and the outlet. Each cooling module comprises a plurality of cooling pipes configured in heat exchange relationship with surrounding seawater.

14 Claims, 3 Drawing Sheets

(56) References Cited

U.S. PATENT DOCUMENTS

| | | | | |
|---|---|---|---|---|
| 4,026,119 | A * | 5/1977 | Dotti | 405/202 |
| 4,134,732 | A * | 1/1979 | Jackson | 422/198 |
| 4,254,818 | A * | 3/1981 | Melamed | 165/45 |
| 4,357,989 | A | 11/1982 | Holzle | |
| 4,384,459 | A * | 5/1983 | Johnston | 60/641.7 |
| 4,411,310 | A * | 10/1983 | Perry et al. | 165/166 |
| 4,566,532 | A * | 1/1986 | Basmajian | 165/45 |
| 4,881,495 | A * | 11/1989 | Tornare et al. | 123/41.31 |
| 5,351,756 | A * | 10/1994 | Minkkinen et al. | 166/267 |
| 5,400,588 | A * | 3/1995 | Yamane et al. | 60/39.465 |
| 5,762,119 | A * | 6/1998 | Platz et al. | 141/231 |
| 5,950,732 | A * | 9/1999 | Agee et al. | 166/354 |
| 5,975,192 | A * | 11/1999 | Moratalla et al. | 165/45 |
| 5,988,280 | A * | 11/1999 | Crawford et al. | 166/303 |
| 6,000,471 | A * | 12/1999 | Langset | 166/268 |
| 6,003,603 | A | 12/1999 | Breivik et al. | |
| 6,079,222 | A * | 6/2000 | Fetescu et al. | 62/601 |
| 6,079,498 | A * | 6/2000 | Lima et al. | 166/370 |
| 6,139,644 | A * | 10/2000 | Lima | 134/8 |
| 6,267,172 | B1 * | 7/2001 | McClung, III | 165/45 |
| 6,338,381 | B1 * | 1/2002 | McClung, III | 165/45 |
| 6,367,429 | B2 * | 4/2002 | Iwasaki et al. | 122/31.1 |
| 6,370,910 | B1 * | 4/2002 | Grootjans et al. | 62/613 |
| 6,494,251 | B2 * | 12/2002 | Kelley | 165/45 |
| 6,585,047 | B2 * | 7/2003 | McClung, III | 166/302 |
| 6,588,500 | B2 * | 7/2003 | Lewis | 166/61 |
| 6,598,408 | B1 * | 7/2003 | Nierenberg | 62/53.2 |
| 6,688,114 | B2 * | 2/2004 | Nierenberg | 62/50.2 |
| 6,703,534 | B2 * | 3/2004 | Waycuilis et al. | 585/15 |
| 6,848,502 | B2 * | 2/2005 | Bishop et al. | 165/154 |
| 6,896,054 | B2 * | 5/2005 | Mcclung, III | 166/246 |
| 7,128,156 | B2 * | 10/2006 | McClung, III | 166/302 |
| 7,293,600 | B2 * | 11/2007 | Nierenberg | 165/41 |
| 8,097,810 | B2 * | 1/2012 | Benestad et al. | 174/152 R |
| 8,176,971 | B2 * | 5/2012 | McClung, III | 165/45 |
| 2004/0050549 | A1 * | 3/2004 | Irwin, Jr. | 166/302 |
| 2008/0148758 | A1 * | 6/2008 | Kidwell et al. | 62/260 |
| 2009/0020288 | A1 | 1/2009 | Balkanyi et al. | |
| 2010/0206570 | A1 * | 8/2010 | Ocampos et al. | 166/303 |
| 2010/0206573 | A1 * | 8/2010 | Paulus et al. | 166/335 |
| 2010/0252227 | A1 * | 10/2010 | Sten-Halvorsen et al. | 165/45 |
| 2011/0100589 | A1 | 5/2011 | Van Der Rest | |
| 2011/0127022 | A1 * | 6/2011 | Eller et al. | 165/168 |
| 2011/0247788 | A1 * | 10/2011 | Martinez et al. | 165/104.33 |
| 2011/0252227 | A1 | 10/2011 | Strong et al. | |
| 2012/0012276 | A1 * | 1/2012 | Von Herzen et al. | 165/45 |
| 2012/0110993 | A1 * | 5/2012 | Whittaker et al. | 60/517 |
| 2012/0125561 | A1 * | 5/2012 | Levings et al. | 165/45 |
| 2012/0298216 | A1 * | 11/2012 | Geertsen | 137/340 |
| 2013/0213649 | A1 * | 8/2013 | Heng et al. | 166/267 |

* cited by examiner

OFFSHORE HYDROCARBON COOLING SYSTEM

CROSS REFERENCE TO RELATED APPLICATIONS

This patent application claims the benefit of priority from Australian Application No. 2011901794, filed May 12, 2011, the contents of which are incorporated herein by reference.

FIELD

The present invention relates to an offshore hydrocarbon cooling system.

BACKGROUND

Cooling systems are essential for several stages of hydrocarbon processing. For example, it is typical to cool hydrocarbon gas from wellhead temperatures, which commonly range from about 80° C. to about 150° C., down to about 30° C. to about 60° C., prior to dehydrating the hydrocarbon gas and/or separating condensates therefrom. Additionally, cooling is also needed after compressing the hydrocarbon gas which may occur at several stages during hydrocarbon processing.

Cooling systems that have been employed for offshore hydrocarbon processing include air cooling systems, direct seawater cooling systems, and indirect seawater cooling systems.

Air cooling systems are simple and cost effective. Their widespread deployment in offshore hydrocarbon processing facilities is restricted, however, by deck-space limitations.

Direct seawater cooling systems employ a pump to lift the seawater, filter and then circulate seawater into a heat exchange circuit which communicates with a hydrocarbon process fluid. The heat exchangers employed in the heat exchange circuit must be fabricated from high specification metals or metal alloys which are resistant to corrosion by both the process fluid and seawater. Accordingly, direct seawater cooling systems often involve difficult fabrication with high cost materials. Seawater fouling and mechanical integrity issues in the heat exchangers may be a concern.

Indirect cooling systems interpose a cooling medium heat exchange circuit between the hydrocarbon process fluid heat exchange circuit and a seawater heat exchange circuit. The cooling medium in the cooling medium heat exchange circuit is typically clean (non-fouling) and non-corrosive. In the indirect cooling system, seawater is typically pumped, filtered and circulated through a circuit which is in heat exchange communication with the cooling medium heat exchange circuit, thereby cooling the cooling medium. The cooled cooling medium, in turn, is employed to cool process fluid which is brought into heat exchange communication with the cooling medium heat exchange circuit.

The indirect cooling medium heat exchange circuit represents an additional heat exchange circuit, associated pumps and make-up capability in comparison with the requirements of the direct cooling system. However, the materials used in the heat exchange circuits do not need to meet the high specification requirements for materials used in the direct cooling system, and heat exchange designs can therefore use larger heat exchange areas (and therefore increase the efficiency of the circuit) for comparative costs. Additionally, the risk of fouling is limited to the seawater heat exchanger only. The cooling medium is a very clean fluid and does not contribute to fouling.

Both direct and indirect cooling systems feature a seawater heat exchange circuit in which seawater is filtered and then pumped onto the offshore processing facility platform, circulated in a heat exchange circuit, before being discharged back into the sea. The filters, pumps, and heat exchange circuits have significant capital and operating expense requirements.

Various devices have been proposed for cooling hydrocarbons subsea, in particular in situations where the hydrocarbons are sourced from subsea wells, as distinct from 'dry tree' platform wells, when the wells are brought up to either fixed or floating platform facilities. Examples where cooling is required includes occasions where the hydrocarbons are from high pressure/high temperature (HP/HT) wells, when cooling is required prior to the hydrocarbons entering export pipelines, and as part of various subsea processing schemes including subsea separation and subsea compression.

The cooling devices generally send the hydrocarbons down a network of pipes from which cooling results from energy loss through the pipe wall to the surrounding sea. There are several significant disadvantages from current proposals:

- It is difficult to control the hydrocarbon temperature, although this may be sometimes achieved by bypassing a fraction of the hydrocarbon. Where cooling is too great and the hydrocarbon fluid flow is low there is a risk of hydrate formation.
- The pipe network is invariably made from a high alloy stainless steel or equivalent which can be prohibitively expensive.
- Apart from hydrates, the pipe cooling network can be predisposed to build up of wax and sometimes sand in periods of reduced flowrates and operating temperatures. These potential blockages are difficult to remove from the pipe network configuration.

One example of such device includes employing a subsea cooling loop to circulate a process fluid through a length of pipe located subsea to directly cool the process fluid and then pump the cooled process fluid back to the offshore processing facility platform for processing and export.

The present invention seeks to overcome at least some of the aforementioned disadvantages.

SUMMARY

In its broadest aspect, the invention provides an offshore hydrocarbon cooling system, a subsea cooling unit, and a method of cooling a hydrocarbon process fluid on an offshore platform, by way of a cooling medium fluid.

According to one aspect of the invention there is provided a hydrocarbon cooling system for an offshore platform, said system comprising:

one or more hydrocarbon process fluid heat exchangers arranged in heat exchange communication between a hydrocarbon process fluid and a cooling medium fluid;
a cooling medium fluid distribution pipe system connected to the hydrocarbon process fluid heat exchangers; and,
a subsea cooling unit for cooling the cooling medium fluid, the subsea cooling unit comprising:
an inlet and an outlet arranged in fluid communication with the cooling medium fluid distribution pipe system;
one or more subsea cooling modules, each cooling module comprising a plurality of cooling pipes configured in heat exchange relationship with surrounding seawater;
a first conduit arranged to provide fluid communication between the inlet and the one or more subsea cooling modules; and a second conduit arranged to provide fluid communication between the one or more subsea cooling modules and the outlet.

According to another aspect of the invention there is provided a subsea cooling unit for cooling a cooling medium fluid circulating through a heat exchange circuit on an offshore platform, the heat exchange circuit having a cooling medium fluid distribution pipe system, the subsea cooling unit comprising:
  an inlet and an outlet arranged in fluid communication with the cooling medium fluid distribution pipe system;
  one or more subsea cooling modules, each cooling module comprising a plurality of cooling pipes configured in heat exchange relationship with surrounding seawater;
  a first conduit arranged to provide fluid communication between the inlet and the one or more subsea cooling modules; and
  a second conduit arranged to provide fluid communication between the one or more subsea cooling modules and the outlet.

In a further aspect of the invention there is provided a method of cooling a hydrocarbon process fluid on an offshore platform, said method comprising:
  passing the hydrocarbon process fluid through a hydrocarbon process fluid heat exchanger and passing a cooling medium fluid through a cooling medium fluid distribution pipe system, wherein said heat exchanger and said pipe system are configured to provide heat exchange communication between the hydrocarbon process fluid and the cooling medium fluid, thereby producing a cooled hydrocarbon fluid and a heated cooling medium fluid; and,
  cooling the heated cooling medium fluid by passing the heated cooling medium fluid through a subsea cooling unit, wherein the subsea cooling unit comprises:
  an inlet and an outlet arranged in fluid communication with the cooling medium fluid distribution pipe system;
  one or more subsea cooling modules, each cooling module comprising a plurality of cooling pipes configured in heat exchange relationship with surrounding seawater;
  a first conduit arranged to provide fluid communication between the inlet and the one or more subsea cooling modules; and
  a second conduit arranged to provide fluid communication between the one or more subsea cooling modules and the outlet.

The system of the present invention may be also adapted for use in a subsea hydrocarbon cooling system.

According to an alternative aspect of the invention there is provided a subsea hydrocarbon cooling system, said system comprising:
  one or more hydrocarbon process fluid heat exchangers arranged in heat exchange communication between a hydrocarbon process fluid and a cooling medium fluid, wherein the one or more hydrocarbon process fluid heat exchangers are located subsea;
  a cooling medium fluid distribution pipe system connected to the hydrocarbon process fluid heat exchangers; and,
  a subsea cooling unit for cooling the cooling medium fluid, the subsea cooling unit comprising:
  an inlet and an outlet arranged in fluid communication with the cooling medium fluid distribution pipe system;
  one or more subsea cooling modules, each cooling module comprising a plurality of cooling pipes configured in heat exchange relationship with surrounding seawater;
  a first conduit for providing fluid communication between the inlet and the one or more subsea cooling modules; and
  a second conduit for providing fluid communication between the one or more subsea cooling modules and the outlet.

DETAILED DESCRIPTION

Figure 1:
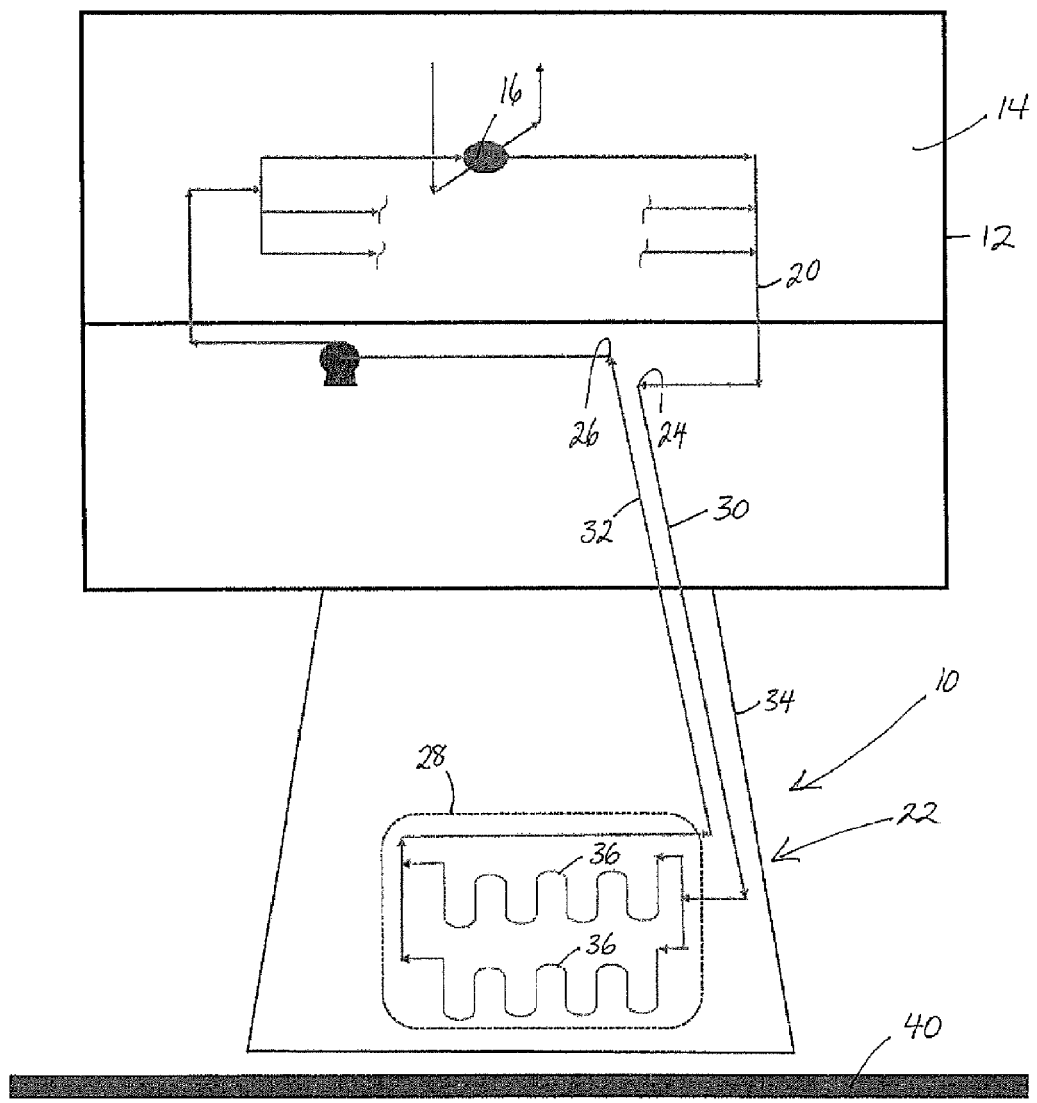
FIG. 1 is a schematic representation of one embodiment of a hydrocarbon cooling system of the present invention for a fixed offshore platform.
Figure 2:
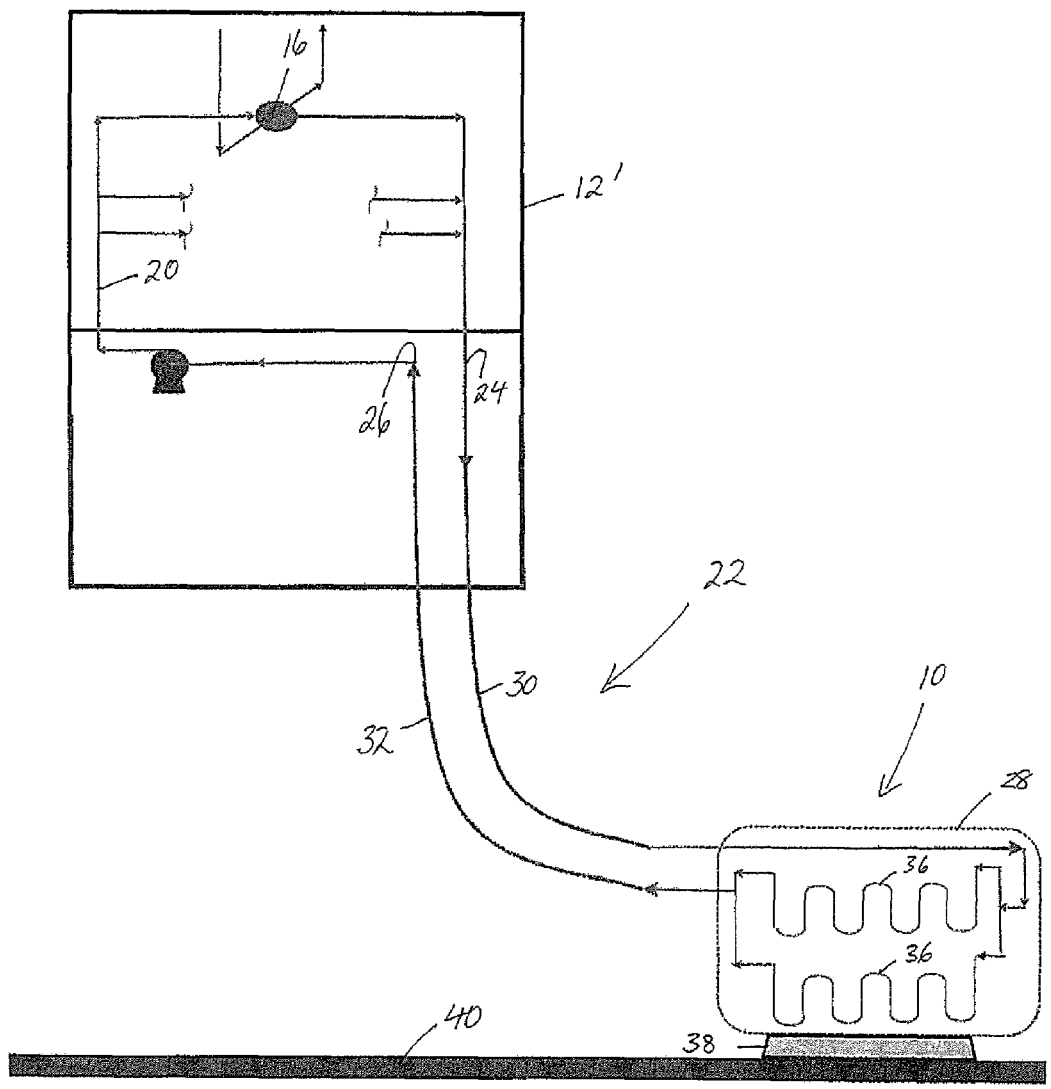
FIG. 2 is a schematic representation of another embodiment of the hydrocarbon cooling system of the present invention for a floating offshore platform.

Referring to FIGS. 1 and 2 there is shown a hydrocarbon cooling system 10 for an offshore platform. The offshore platform may be a fixed offshore platform 12 or a floating offshore platform 12', as shown in FIGS. 1 and 2, respectively.

The fixed platform 12 consists of a deck located above the sea surface supported on a substructure anchored directly onto the seabed. The substructure may be built on concrete or steel legs, or both, anchored directly onto the seabed, supporting a deck with space for drilling rigs, production facilities and crew quarters. Various types of substructure are used, including steel jacket, concrete caisson, floating steel and even floating concrete. Steel jackets are vertical sections made of tubular steel members, and may be piled into the seabed. Concrete caisson structures often have in-built oil storage in tanks below the sea surface. In general, fixed platforms are economically feasible for installation in water depths up to about 200 m.

Other types of fixed platform 12 include, but are not limited to, a compliant tower consisting of slender flexible towers and a pile foundation supporting a conventional deck for drilling and production operations; or a gravity based substructure (GBS) constructed of either steel or concrete and anchored directly onto the seabed.

The floating platform 12' may be one of several different types of floating platform 12' including, but not limited to, a semi-submersible platform which has a hull comprised of columns and pontoons of sufficient buoyancy to cause the structure to float, but of sufficient weight to keep the structure upright; floating production, storage, and offloading systems (FPSO); floating storage and offloading system (FSO); floating liquefied natural gas production units (FLNG); tension-leg platforms (TLPs) which are floating platforms tethered to the seabed in a manner that eliminates most vertical movement of the structure; and spar platforms which are moored to the seabed with conventional mooring lines.

The offshore platforms 12, 12' are generally sea-based, but could equally apply to any body of water including inland or lake-based water bodies. It will be appreciated that a reference to a sea floor, sea bed, or seawater may equally apply to a lake floor, lake bed, or lakewater and/or freshwater and/or saltwater and/or brine, respectively, depending on the location of the offshore platform and the character of the body of water in which it is located.

The offshore platform 12, 12' includes a hydrocarbon processing area 14 located on the deck of the offshore platform 12, 12'. The hydrocarbon processing area 14 is configured to process hydrocarbon fluids extracted from one or more well heads located in the sea bed and delivered to the platform 12, 12' via a production line (not shown). The production wells may be an integrated part of the platform or may be remote from subsea wells or remote from an alternate platform. For example, where natural gas is extracted, the hydrocarbon processing area 14 may include various processing units to dehydrate and sweeten the natural gas, separate condensates such as NGLs, decrease nitrogen concentration, and optionally, liquefy the natural gas. Any one of the various processing units may require a cooling system to cool the hydrocarbon fluid. It will be appreciated that one or more of the cooling systems 10 of the present invention may be conveniently integrated into the hydrocarbon processing area 14 of the offshore platform 12, 12'.

The system 10 includes a heat exchanger 16 arranged in heat exchange communication with a hydrocarbon fluid. The heat exchanger 16 may be of various types, such as shell & tube, plate-fin, compact welded or various others well understood by those skilled in the art, and may be arranged in various configurations (series/parallel), locations, and number as part of the overall hydrocarbon processing that may occur on the platform 12, 12'.

The term 'hydrocarbon fluid' refers to a gas, liquid, or dual phase liquid-gas stream containing one or more hydrocarbons. The hydrocarbon may be extracted directly from a well head in the form of a liquid, for example in the form of crude oil, or as a gas, for example in the form of natural gas, or as a mixture of natural gas and crude oil. Alternatively, the hydrocarbon may be derived from the extracted hydrocarbon by various processing treatments, including dehydration, fractional distillation, cryogenic distillation, solvent absorption, pressure-swing absorption, and other processing techniques as will be well understood by those skilled in the art. In general, the hydrocarbon fluid will be communicated to the heat exchanger 16 from a processing unit within the hydrocarbon processing area 14 via conduit.

The system 10 also includes a heat exchange circuit 20 disposed in parallel heat exchange relationship with the heat exchanger 16. A cooling medium fluid circulates through the heat exchange circuit 20. It will be appreciated that FIGS. 1 and 2 show a schematic representation of the relationship between heat exchange circuit 20 and heat exchanger 16.

The temperature of the cooling medium fluid is less than the temperature of the hydrocarbon fluid. When the hydrocarbon fluid is passed through the heat exchanger 16, thermal energy from the hydrocarbon fluid is transferred to the cooling medium fluid which is circulated through the heat exchange circuit 20. Consequently, the hydrocarbon fluid is cooled.

The cooling medium fluid may be any suitable fluid which is capable of flowing through the heat exchange circuit 20 and facilitates transfer of heat from a fluid, such as a hydrocarbon fluid, via the heat exchanger 16. Preferably, the cooling medium fluid has a high thermal capacity, low viscosity, is low cost, non-toxic, and chemically inert, neither causing nor promoting corrosion of the heat exchange circuit 20.

In general, the cooling medium fluid of the present invention may be a liquid, although in some alternative embodiments of the invention the cooling medium may be a gas.

Additionally, while it is envisaged that the cooling medium fluid will maintain its phase within the heat exchange circuit 20, in some embodiments, the cooling medium fluid may undergo a phase change, whereby the latent heat associated with the phase change increases the cooling efficiency of the heat transfer between the hydrocarbon fluid and the cooling medium fluid.

Suitable examples of cooling medium fluids include, but are not limited to, aqueous media containing additives to inhibit corrosion within the heat exchange circuit 20, depress the melting point and/or raise the boiling point. In a preferred embodiment the cooling medium fluid comprises water mixed with a suitable organic chemical, such as ethylene glycol, diethylene glycol, or propylene glycol.

Both the heat exchanger 16 and the heat exchange circuit 20 may be disposed on the offshore platform 12, 12'. In general, the heat exchanger 16 and the heat exchange circuit 20 may be disposed in the hydrocarbon processing area 14 on the offshore platform 12, 12'.

The system 10 of the present invention also includes a subsea cooling unit 22 for cooling the cooling medium fluid. In use, the cooling medium fluid must be continuously cooled for reuse as a heat transfer fluid as it circulates through the heat exchange circuit 20.

The subsea cooling unit 22 includes an inlet 24 and an outlet 26 which are connectable to the heat exchange circuit 20, and one or more subsea cooling modules 28. The one or more subsea cooling modules 28 are arranged in fluid communication with the inlet 24 and the outlet 26 via a first riser 30 and a second riser 32, respectively.

In the embodiment described in FIG. 1 in respect of an offshore fixed platform 12, the first and second risers 30, 32 may be rigid conduits that are attached to a jacket 34 or substructure base 34 of the fixed platform 12. The first and second risers 30, 32 may be pre-installed when the fixed platform 12 is constructed or retro-fitted into an existing fixed platform 12.

In the embodiment described in FIG. 2 in respect of an offshore floating platform 12', the first and second risers 30, 32 are generally of similar type of conduits used as production risers, for example, flexible pipe, steel catenary, or top tensioned risers. However, the design requirements of the first and second risers 30, 32 are anticipated to be less onerous than production risers for several reasons. In particular, the first and second risers 30, 32 operate at low to moderate pressure in comparison to production risers; and inert cooling medium fluid, rather than potentially corrosive hydrocarbon fluid, passes through the first and second risers 30, 32.

The cooling module 28 comprises a plurality of cooling pipes 36 configured in heat exchange relationship with surrounding seawater. The plurality of cooling pipes 36 may be configured in a simple network of fully-welded small bore pipe lengths, typically of about 1½ inch diameter. The inventor estimates that approximately 150 m of 1½ inch pipe would provide a typical cooling duty of around 0.25 MW, and cool 1500 bpd (barrels per day) or 240 $m^3/h$ of cooling medium by approximately 25° C. A manifolded unit of 10 lengths of such pipe in parallel would have a cooling duty of about 2.5 MW. Several manifolded units could be combined in the cooling module 28.

It will be appreciated that the diameter, individual lengths of pipe, number of manifolded units and cooling modules may vary and be optimised according to the desired design and performance requirements as well as ambient conditions.

Further, it will be appreciated that further cooling to lower temperatures may be possible with longer lengths. Efficiency, in terms of heat loss per unit length of pipe decreases with a lower temperature differential between the cooling medium and the ambient seawater. It is envisaged that in some embodiments, a portion of the cooling medium could be cooled or chilled to a lower temperature, with series units, in addition to, or alternatively to, the parallel arrangement described above.

The one or more subsea cooling modules 28 are preferably located above the sea bed 40. Sea currents are reduced very close to the sea bed 40. Therefore, locating the cooling modules 28 some meters above the sea bed 40 may have the advantage of exposing the cooling modules 28 to stronger sea currents. Stronger currents may generate some improvement in the efficiency of heat transfer from the cooling modules 28, although inherent thermal convection may largely contribute to adequate thermal energy transfer when sea currents are weak or absent. Spacing between the cooling modules 28 and the sea bed may be determined by the length of the first and second risers 30, 32.

Additionally, or alternatively, the subsea cooling modules 28 may be supported by 'mud mats' 38 residing on the sea bed 40, as shown in FIG. 2. In this particular embodiment, the spacing between the cooling modules 28 and the sea bed 40 may be determined by the height of the mud mats 38 which support the cooling modules 28. The mud mats 38 may be simple structural steel pallets. In some embodiments, the mud mat 38 could incorporate lengths of large diameter pipe through which the cooling medium fluid could also be circulated and/or distributed to the cooling modules 28.

In some embodiments, the subsea cooling modules 28 may be located remotely (i.e. several kilometers) from the offshore platform 12, 12' in deeper and colder seawater. In this embodiment the first and second risers 30, 32 may be in communication with the cooling modules 28 via respective seabed pipes. Colder seawater may significantly improve cooling efficiency as will the length of seabed pipe. The inventor notes that such additional cooling benefits would have to outweigh the costs associated with fabricating and installing offshore pipelines.

It will also be appreciated that in some alternative embodiments the first and second risers 30, 32 may be replaced with suitable conduits 30', 32' to facilitate substantially lateral placement of the cooling modules 28 in relation to the offshore platform 12, 12'. In particular, these embodiments may be employed where provision of risers for floating offshore platforms 12' may be technically difficult eg. turret/swivel issues. In these embodiments, the cooling modules 28 could be tethered to the floating platform 12' by chains, wires or other rigid structural support mechanisms.

Figure 3:
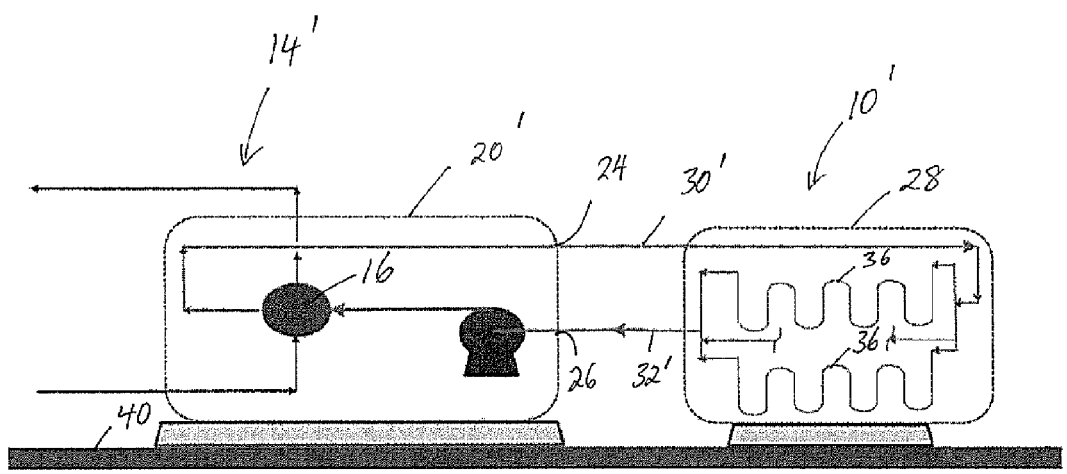
FIG. 3 is a schematic representation of an alternative embodiment of a subsea hydrocarbon cooling system of the present invention.

Referring now to FIG. 3, where like numerals refer to like parts throughout, there is shown a subsea hydrocarbon cooling system 10'.

In contrast to the embodiments of the invention described with reference to FIGS. 1 and 2, a hydrocarbon processing area 14' is located subsea. Notwithstanding the difference in location, the hydrocarbon processing area 14' is configured to process hydrocarbon fluids in accordance with subsea processing requirements, such as subsea condensate separation and subsea compression processes. It will be appreciated that the subsea processing requirements will have a need for hydrocarbon fluid cooling.

Accordingly, the system 10' includes a heat exchanger 16 arranged in heat exchange communication with a hydrocarbon fluid and a heat exchange circuit 20' disposed in parallel heat exchange relationship with the heat exchanger 16. The cooling medium fluid, as described previously, is circulated through the heat exchange circuit 20'.

Both the heat exchanger 16 and the heat exchange circuit 20' are disposed subsea, preferably supported by mud mats, as previously described with reference to FIG. 2, on the seafloor 40. It will be appreciated that the heat exchanger 16 and the heat exchange circuit 20' will be fabricated from materials which are suitable for use in a subsea environment and which are corrosion resistant. For example, the shell of the heat exchanger 16 may be fabricated from carbon steel, with appropriate cathodic protection to resist external corrosion, as per the cooling module 28. The heat exchanger 16 shell may be lined with a suitable corrosion resistant alloy (CRA), stainless steel or equivalent material suitable to resist corrosion from the hydrocarbon fluid.

The system 10' of the present invention also includes a subsea cooling unit 22 for cooling the cooling medium fluid located proximal to the heat exchanger 16 and the heat exchange circuit 20'. The subsea cooling unit 22 includes an inlet 24 and an outlet 26 which are connectable to the heat exchange circuit 20', and one or more subsea cooling modules 28 as described previously with reference to FIGS. 1 and 2. The one or more subsea cooling modules 28 are arranged in fluid communication with the inlet 24 and the outlet 26 via a first conduit 30' and a second conduit 32', respectively.

The first and second conduits 30', 32' may be lengths of hard pipe or flexible pipe.

The flow of cooling medium fluid (and hence the degree of cooling achieved) through heat exchange circuit 20' may be controlled via a flow control valve (not shown) in the cooling medium circuit 20'. Alternatively, flow may be controlled with a pump, such as a single phase variable speed pump, which is also located subsea. Pump service is not expected to be onerous due to the controlled, clean and single phase nature of the cooling medium fluid.

In use, a hydrocarbon fluid may be cooled on an offshore platform 12, 12' (or subsea) by passing the hydrocarbon fluid through the heat exchanger 16 which is disposed in heat exchange relationship with the heat exchange circuit 20, 20'. The hydrocarbon fluid transfers thermal energy to the cooling medium fluid which is circulated through the heat exchange circuit 20, 20', thereby cooling the hydrocarbon fluid and heating the cooling medium fluid.

The heated cooling medium fluid is subsequently cooled by diverting the heated cooling medium fluid from the heat exchange circuit 20, 20' into the subsea cooling unit 22. The heated cooling medium fluid enters the subsea cooling unit 22 through an inlet 24 and is passed into one or more subsea cooling modules 28 via a first riser 30 or first conduit 30'. The subsea cooling module(s) 28 are in heat exchange relationship with the surrounding seawater and therefore thermal energy in the heated cooling medium fluid is transferred to the surrounding seawater as cooling medium fluid is passed through the cooling module(s) 28. The cooled cooling medium fluid is then redirected from the cooling module(s) 28 to the heat exchange circuit 20 through outlet 26 via second riser 32 or second conduit 32'.

It will be readily apparent to a person skilled in the relevant art that the present invention has significant advantages over the prior art including, but not limited to, the following:

There is no direct use of seawater. Seawater is a difficult fluid to work with due to its corrosiveness, as well as issues associated with entrained marine life, fouling, and scale. In contrast to prior art hydrocarbon cooling systems, the present invention avoids any pumping or handling of seawater in any area.

Consequently, the capital expenditure normally associated with seawater lift pumps, seawater caissons, filtration and chlorination units in prior art hydrocarbon cooling systems is eliminated in the present invention.

Deck space for the hydrocarbon processing area 14 is limited. In the present invention, a space limitation issue is less of a concern and any number of required subsea cooling modules 28 may be installed in the subsea region proximal the platform 12, 12'. The cooling capacity of the system 10 of the present invention can be scaled according to need.

In the absence of pumping and handling seawater, there are few operating and maintenance issues with corrosion, chlorination and filtration non-performance, and fouling. As no seawater lift pump is required, there will be no maintenance associated with these units. Accordingly, this will result in an overall reduction in operating expenditure and a reduced incidence of production outage due to maintenance requirements.

This reduction in maintenance activities brings an inherent improvement in safety, as any offshore activity carries a safety risk, not just from the activity itself, but from the necessary support requirements including helicopter flights and such like.

The deck area of the platform may be reduced through the elimination of equipment, including seawater lift pumps, filters and chlorination unit, and an additional heat exchange circuit for the cooling medium/seawater. The reduction in deck area consequently provides a saving in structural steel. Additionally, topside payload of the deck is significantly reduced through elimination of equipment.

The load on a jacket and floating structure is also reduced by elimination of large seawater lift caissons and, to a lesser extent, discharge caissons. For example, a 36 inch caisson for about 900 m$^3$/h of seawater would be replaced by a 16 inch riser in the present invention.

In conventional hydrocarbon cooling systems, the seawater lift pumps and caissons represent a jacket-topsides interface that must be hooked-up and commissioned. Elimination of both the pumps and caissons will save hook-up time. Connecting the first and second risers 30, 32 to the heat exchange circuit 20 may be relatively simple in comparison. The cooling units 22 of the present invention may be conveniently pre-filled with cooling medium fluid prior to commissioning.

The cooling modules 28 may be constructed of carbon steel, ensuring cost savings. Standard cathodic protection, such as zinc anodes, can be provided on the external surfaces of the cooling modules 28 in a similar fashion to how existing carbon steel export pipelines and steel jackets are protected from corrosion in seawater.

In the present invention, the cooling modules 28 are not operated at high pressure and they do not contain hydrocarbon fluid. Accordingly, the risk of leaks into the surrounding seawater is reduced, as are the consequences if a leak should arise. In the event of damage, the cooling modules 28 could be isolated (such as with an ROV) with operation continuing until the cooling module 28 is replaced.

Conventional hydrocarbon cooling systems may discharge warm seawater in close proximity to the sea surface. This warm water plume is more buoyant than surrounding cold water and takes time and distance to disperse. In contrast, the present system generates warm seawater close to the seabed. The warm seawater is buoyant compared to the surrounding cooler seawater and hence inherently generates an upward convection current, in turn promoting mixing with surrounding water layers. The warm water is more quickly dissipated and cooled with much less impact, if any, on surface sea life.

Conventional hydrocarbon cooling systems may also chlorinate seawater, when used as a heat transfer fluid, to prevent biofouling, and subsequently discharge the chlorinated seawater with associated negative environmental impacts. The avoidance of using seawater as a heat transfer fluid eliminates this particular risk from the present invention.

The subsea hydrocarbon cooling system of the present invention allows for temperature control of the hydrocarbon fluid. Cooling may be accurately controlled from 'fully off' to maximum cooling as per design requirements.

Cooling does not involve any valves or by-pass operation of the hydrocarbon stream. Temperature control is achieved by controlling the flow of the cooling medium fluid which significantly simplifies the process.

There is a reduced risk of hydrate formation and blockages associated with wax or sand build by employing the subsea hydrocarbon cooling system of the present invention.

The subsea cooling module is likely to be fabricated from carbon steel, and hence significantly lower capital costs are likely to be incurred in comparison with those incurred with conventional systems which directly cool and contain the hydrocarbon fluid in a subsea environment.

Numerous variations and modifications will suggest themselves to persons skilled in the relevant art, in addition to those already described, without departing from the basic inventive concepts. All such variations and modifications are to be considered within the scope of the present invention, the nature of which is to be determined from the foregoing description.

It is to be understood that, although prior art use and publications may be referred to herein, such reference does not constitute an admission that any of these form a part of the common general knowledge in the art, in Australia or any other country.

For the purposes of this specification it will be clearly understood that the word "comprising" means "including but not limited to", and that the word "comprises" has a corresponding meaning.

The claims defining the invention are as follows:

1. A hydrocarbon cooling system for an offshore platform having a subsea structure, said system comprising:
   one or more hydrocarbon process fluid heat exchangers located on the offshore platform and arranged in heat exchange communication between a hydrocarbon process fluid and a cooling medium fluid;
   a cooling medium fluid distribution pipe system located on the offshore platform and connected to the hydrocarbon process fluid heat exchangers; and
   a subsea cooling unit for cooling the cooling medium fluid, the subsea cooling unit comprising:
      an inlet and an outlet arranged in fluid communication with the cooling medium fluid distribution pipe system;
      one or more subsea cooling modules disposed externally of the subsea structure in open sea, each cooling module comprising a plurality of cooling pipes configured in heat exchange relationship with surrounding seawater, wherein the one or more subsea cooling modules are supported above the sea bed by one or more mud mats residing on the sea bed;
      a first riser arranged to provide fluid communication between the inlet and the one or more subsea cooling modules; and
      a second riser arranged to provide fluid communication between the one or more subsea cooling modules and the outlet.

2. The system according to claim 1, wherein the offshore platform is a fixed offshore platform.

3. The system according to claim 1, wherein the offshore platform is a floating offshore platform.

4. The system according to claim 1, wherein the one or more respective mud mats comprise a pallet.

5. The system according to claim 1, wherein the one or more respective mud mats incorporate lengths of pipe through which the cooling medium fluid is circulated and/or distributed to the one or more cooling modules.

6. The system according to claim 1, wherein the one or more cooling modules are located remotely from the offshore platform.

7. The system according to claim 6, wherein the first and second risers are arranged in fluid communication with the cooling modules via respective seabed pipes.

8. The system according to claim 1, wherein the one or more subsea cooling modules are located substantially laterally with respect to the offshore platform.

9. The system according to claim 8, wherein the one or more subsea cooling modules are tethered to the offshore platform.

10. The system according to claim 1, wherein the one or more hydrocarbon process fluid heat exchangers are located subsea.

11. A subsea cooling unit for cooling a cooling medium fluid circulating through a heat exchange circuit on an offshore platform having a subsea structure, the heat exchange circuit having a cooling medium fluid distribution pipe system, the subsea cooling unit comprising:
    an inlet and an outlet arranged in fluid communication with the cooling medium fluid distribution pipe system;
    one or more subsea cooling modules disposed externally of the subsea structure in open sea, each cooling module comprising a plurality of cooling pipes configured in heat exchange relationship with surrounding seawater, wherein the one or more subsea cooling modules are supported above the sea bed by one or more mud mats residing on the sea bed;
    a first riser arranged to provide fluid communication between the inlet and the one or more subsea cooling modules; and
    a second riser arranged to provide fluid communication between the one or more subsea cooling modules and the outlet.

12. The subsea cooling unit according to claim 11, wherein the plurality of cooling pipes are configured in a manifold of parallel lengths of pipe.

13. A method of cooling a hydrocarbon process fluid on an offshore platform having a subsea structure, said method comprising:
    passing the hydrocarbon process fluid through a hydrocarbon process fluid heat exchanger and passing a cooling medium fluid through a cooling medium fluid distribution pipe system, wherein said heat exchanger and said pipe system are configured to provide heat exchange communication between the hydrocarbon process fluid and the cooling medium fluid, thereby producing a cooled hydrocarbon fluid and a heated cooling medium fluid; and,
    cooling the heated cooling medium fluid by passing the heated cooling medium fluid through a subsea cooling unit, wherein the subsea cooling unit comprises:
        an inlet and an outlet arranged in fluid communication with the cooling medium fluid distribution pipe system;
        one or more subsea cooling modules disposed externally of the subsea structure in open sea, each cooling module comprising a plurality of cooling pipes configured in heat exchange relationship with surrounding seawater, wherein the one or more subsea cooling modules are supported above the sea bed by one or more mud mats residing on the sea bed;
        a first riser arranged to provide fluid communication between the inlet and the one or more subsea cooling modules; and
        a second riser arranged to provide fluid communication between the one or more subsea cooling modules and the outlet.

14. A subsea hydrocarbon cooling system, said system comprising:
    one or more hydrocarbon process fluid heat exchangers arranged in heat exchange communication between a hydrocarbon process fluid and a cooling medium fluid, wherein the one or more hydrocarbon process fluid heat exchangers are located subsea;
    a cooling medium fluid distribution pipe system connected to the hydrocarbon process fluid heat exchangers; and,
    a subsea cooling unit for cooling the cooling medium fluid, the subsea cooling unit comprising:
        an inlet and an outlet arranged in fluid communication with the cooling medium fluid distribution pipe system;
        one or more subsea cooling modules disposed in open sea, each cooling module comprising a plurality of cooling pipes configured in heat exchange relationship with surrounding seawater, wherein the one or more subsea cooling modules are supported above the sea bed by one or more mud mats residing on the sea bed;
        a first riser for providing fluid communication between the inlet and the one or more subsea cooling modules; and
        a second riser for providing fluid communication between the one or more subsea cooling modules and the outlet.

* * * * *